July 26, 1949.  I. J. KUERT  2,477,064
FRAME SHIFTING APPARATUS
Filed April 14, 1947
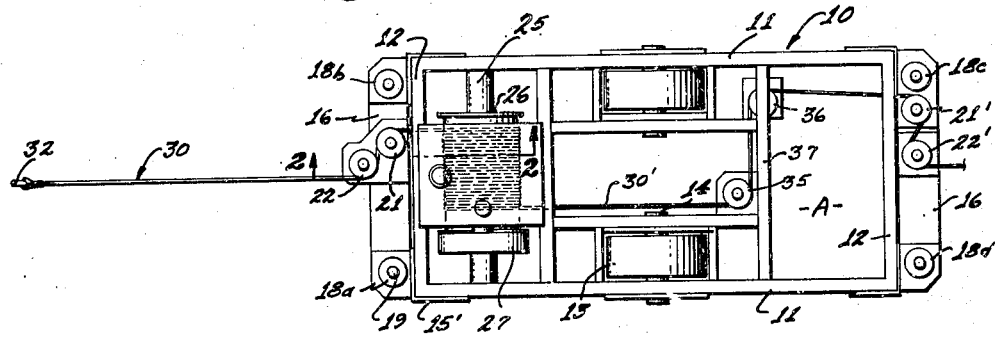
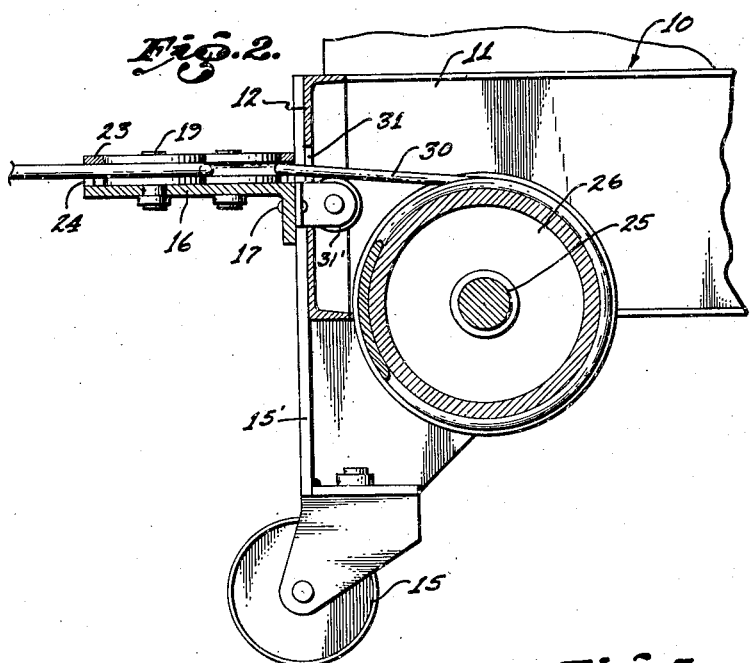
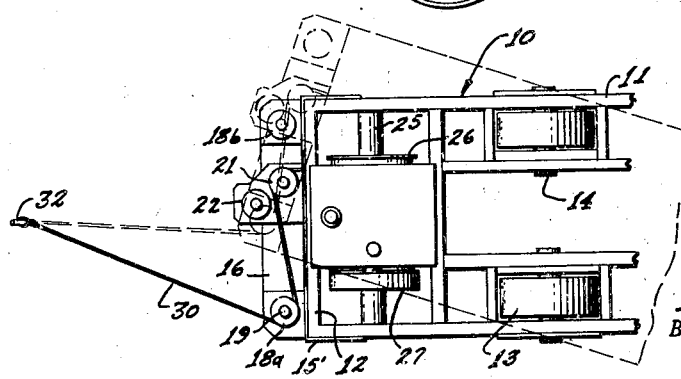
INVENTOR.
IRA. J. KUERT
BY
B. J. Craig
ATTORNEY Patented July 26, 1949

2,477,064

UNITED STATES PATENT OFFICE 2,477,064

FRAME SHIFTING APPARATUS

Ira J. Kuert, San Gabriel, Calif.

Application April 14, 1947, Serial No. 741,371

1 Claim. (Cl. 254—190)

This invention relates to a frame shifting apparatus.

The general object of the invention is to provide a novel shifting mechanism for a frame such as a frame for a mobile tower.

A more specific object of the invention is to provide a novel arrangement of pulley members mounted on a wheeled frame which supports a cable winding mechanism and wherein a cable operable by the winding mechanism passes over the pulley members in such a manner that the frame will be shifted by movement of the cable.

Other objects and advantages of my invention will be apparent from the following description taken in connection with the accompanying drawings, wherein:

Fig. 1 is a top plan view of a wheeled frame with the upper guide plates for the pulleys omitted;

Fig. 2 is a section taken on line 2—2, Fig. 1, and

Fig. 3 is a fragmentary view similar to Fig. 1, showing the shifting operation.

Referring to the drawing by reference characters, I have shown my invention as embodied in a frame 10 which may be the frame of a concrete handling apparatus such as shown in my co-pending application Serial No. 741,370, filed April 14, 1947.

The frame includes side members 11 and end members 12, with supporting wheels 13 mounted on axles 14 disposed intermediate the length of the sides 11. At the corners the frame is shown as provided with caster wheels 15 which are mounted on brackets 15' secured to the frame 10.

The end members 12 are each provided with a projecting support shown as an angle member 16 held in place as by rivets 17. As shown, the angle members 16 extend the full width of the ends 12 and at each end of the angle members 16 I provide a pulley, 18a, 18b, 18c and 18d, respectively. Mounted on shafts 19 and intermediate the length of each angle member 16 at one end I provide a pair of pulleys 21 and 22 and at the other end a pair of pulleys 21' and 22'. Each pulley includes upper and lower guide plates 23 and 24.

Mounted on the frame adjacent one of the end members 12, I show a shaft 25 supporting a drum 26 which may be driven in either direction by suitable drive means 27 which forms no part of the present invention.

A cable 30 is wrapped about the drum 26. One end member 12 is provided with a hole 31 for the cable. The cable passes from the drum over a roller 31' and around the pulleys 21 and 22, as shown in Fig. 1, and is secured to a stake or other fixed member 32. When the drum 26 is rotated in a clockwise direction, in Fig. 2, the frame 10 will be pulled in a forward direction towards the stake 32.

In order to shift the frame abruptly from the solid line position shown in Fig. 3 to the dotted line position shown in this figure, the cable 30 is run from the pulley 21 around the pulley 18a as shown in Fig. 3. With this arrangement, when the drum is operated the frame 10 will be abruptly shifted to the dotted line position shown in Fig. 3.

For an abrupt shifting in a direction in reverse to that shown in Fig. 3, the cable 30 is run over the pulleys 21 and 22 as shown in Fig. 1 and is then run over the pulley 18b and thence to the stake 32, whereupon operation of the drum 26 will abruptly move the frame 10 opposite to the dotted line position shown in Fig. 3.

To move the frame in a direction opposite to that just described, the cable is released from the stake 32 and another cable 30' on the same drum is run from the drum 26 towards the other end of the frame 10. The cable 30' first passes over a pulley 35 then over a pulley 36 and thence over the pulleys 21' or 22' to an anchor (not shown) for a straight rearward movement of the frame.

The pulley 35 is mounted adjacent to a transverse member 37 on the frame and the pulley 36 is mounted beneath the transverse member 37. In this way the cable 30' is led around the space A in which depending portions of mechanism might be arranged.

To move the frame rearwardly and abruptly in one direction, the cable 30' is arranged so that it passes from the pulley 36 onto the pulley 18c and thence to the anchor; and to move the frame rearwardly and abruptly in the other direction, the cable is run over pulleys 36, 21', 22' and then over pulley 18d and thence to the anchor.

The member 37 has a hole (not shown) similar to the hole 31 through which the cable 30' passes.

The pulleys 22 and 22' are so arranged that the cables 30 and 30' when running thereover and thence to the anchor have their pulling effect along the longitudinal axis of the frame 11.

From the foregoing description, it will be apparent that I have invented a novel frame shifting apparatus which is extremely simple in operation and is easily constructed and assembled.

Having thus described my invention, I claim:

In a shifting apparatus, a frame including side and end members, a transverse support member extending from each end of the frame, a pair of pulleys on each support member, one of the previously mentioned pulleys being disposed at each corner of the frame, a pair of pulleys disposed on each support member and between the adjacent corner pulleys, a drum on said frame, a cable on the drum, said cable being adapted to be passed selectively over the pulleys at one end of the frame, a second cable on the drum, a pulley intermediate the length of the frame and adapted to receive said second cable, and another pulley arranged laterally of said last mentioned pulley and adapted to receive the second cable, the second cable being adapted to be led from said laterally arranged pulley selectively over the pulleys at the other end of the frame.

IRA J. KUERT.

REFERENCES CITED

The following references are of record in the file of this patent:

UNITED STATES PATENTS

| Number | Name | Date |
|---|---|---|
| 1,139,810 | Sessions | May 18, 1915 |
| 1,378,357 | Levin | May 17, 1921 |